DEFENSIVE PUBLICATION

UNITED STATES PATENT OFFICE

Published at the request of the applicant or owner in accordance with the Notice of Dec. 16. 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 10

T883,011

TWO-STAGE AIR COMPRESSOR

Gerald R. Miller, Northville, Mich., assignor to Ford Motor Company, Dearborn, Mich., a corporation of Delaware

Continuation of application Ser. No. 769,582, Oct. 22, 1968. This application Apr. 27, 1970, Ser. No. 29,756

Int. Cl. F04b *25/00*

U.S. Cl. 417—259

1 Sheet Drawing. 7 Pages Specification

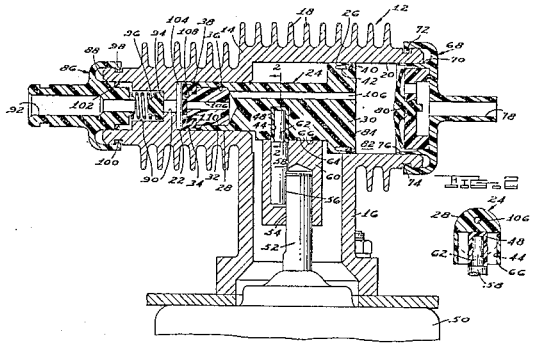

A two-stage air compressor having a stepped diameter reciprocating piston. A first compression chamber is separated from a second compression chamber by a passageway and check valve formed within the stepped diameter piston Feb. 2, 1971 G. R. MILLER T883,011
TWO-STAGE AIR COMPRESSOR
Original Filed Oct. 22, 1968
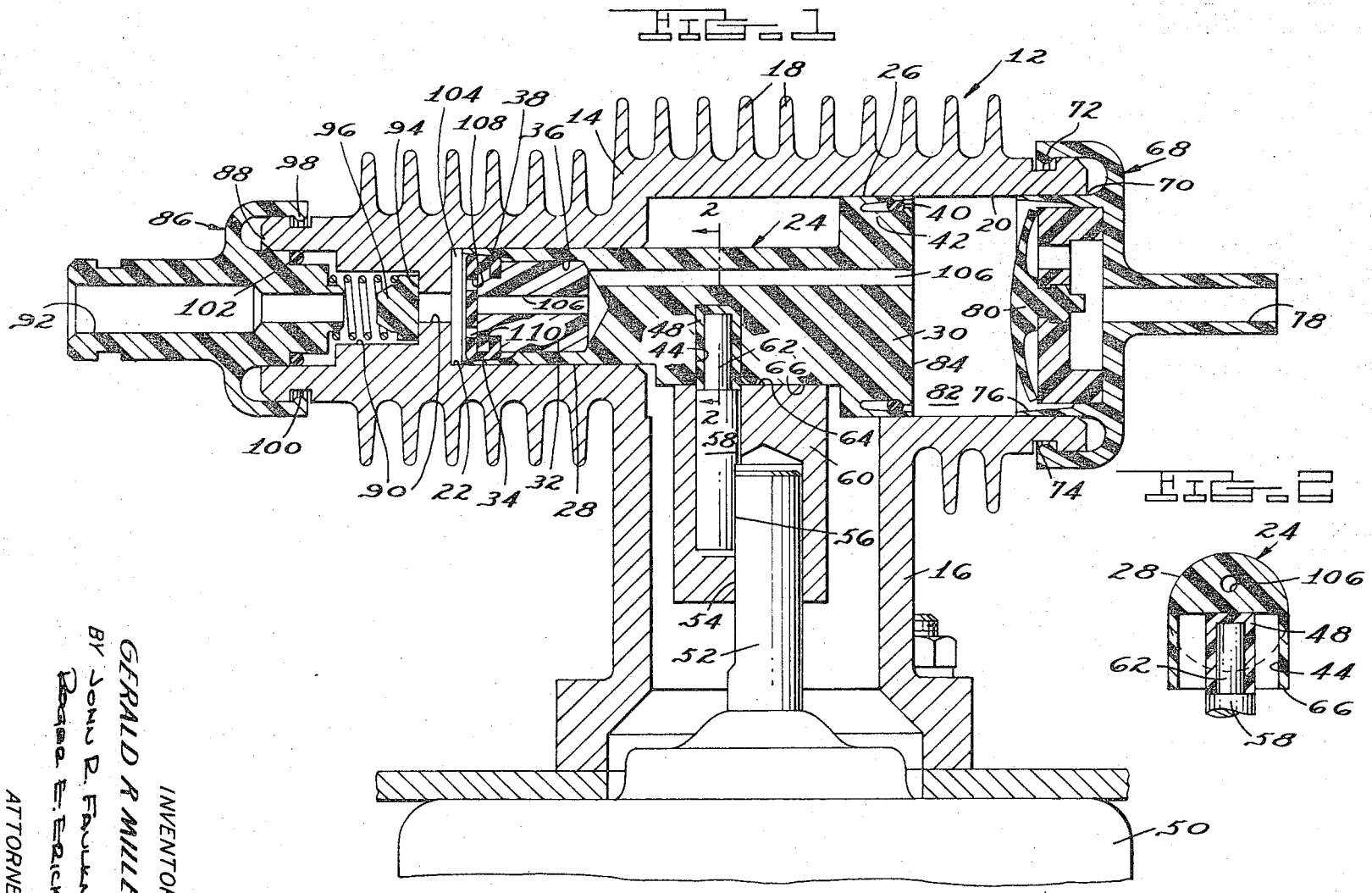
INVENTOR
GERALD R MILLER
BY JOHN R. FAULKNER
ROGER E. ERICKSON
ATTORNEYS